(12) United States Patent
Rho

(10) Patent No.: US 9,367,388 B2
(45) Date of Patent: Jun. 14, 2016

(54) MEMORY SYSTEM INCLUDING RANDOMIZER AND DERANDOMIZER

(71) Applicant: SK hynix Inc., Gyeonggi-do (KR)

(72) Inventor: Jun Rye Rho, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 94 days.

(21) Appl. No.: 14/276,619

(22) Filed: May 13, 2014

(65) Prior Publication Data

US 2015/0154067 A1    Jun. 4, 2015

(30) Foreign Application Priority Data

Dec. 3, 2013   (KR) ........................ 10-2013-0149447

(51) Int. Cl.
*G11C 29/00* (2006.01)
*G06F 11/10* (2006.01)

(52) U.S. Cl.
CPC ........ *G06F 11/1008* (2013.01); *G06F 11/1044* (2013.01); *G06F 11/1068* (2013.01); *G06F 11/1076* (2013.01)

(58) Field of Classification Search
CPC ............ G06F 11/1008; G06F 11/1076; G06F 11/1068; G11C 7/1006
See application file for complete search history.

(56) References Cited

U.S. PATENT DOCUMENTS

| 5,717,535 | A  | * | 2/1998  | French   | G11B 5/012    |
|           |    |   |         |          | 360/48        |
| 5,931,968 | A  | * | 8/1999  | Gray     | G11B 20/10    |
|           |    |   |         |          | 714/739       |
| 6,052,815 | A  | * | 4/2000  | Zook     | G11B 20/1833  |
|           |    |   |         |          | 714/758       |
| 6,493,842 | B1 | * | 12/2002 | Kondo    | H04N 9/8047   |
|           |    |   |         |          | 375/E7.265    |
| 7,080,312 | B2 | * | 7/2006  | Kondo    | H04N 19/89    |
|           |    |   |         |          | 375/E7.205    |
| 7,873,803 | B2 |   | 1/2011  | Cheng    |               |
| 8,255,643 | B2 | * | 8/2012  | Mun      | G06F 11/1072  |
|           |    |   |         |          | 711/103       |
| 8,339,854 | B2 | * | 12/2012 | Yoon     | G11C 11/5628  |
|           |    |   |         |          | 365/185.12    |
| 8,370,561 | B2 | * | 2/2013  | Sharon   | G11C 11/5628  |
|           |    |   |         |          | 711/103       |
| 8,694,873 | B2 | * | 4/2014  | Kim      | G06F 11/1012  |
|           |    |   |         |          | 714/781       |
| 8,856,428 | B2 | * | 10/2014 | Lee      | G06F 11/1048  |
|           |    |   |         |          | 711/103       |

FOREIGN PATENT DOCUMENTS

| KR | 1020100121472 | 11/2010 |
| KR | 1020120097963 | 9/2012  |
| KR | 1020130042336 | 4/2013  |
| KR | 1020130052971 | 5/2013  |

* cited by examiner

*Primary Examiner* — Esaw Abraham
(74) *Attorney, Agent, or Firm* — IP & T Group LLP

(57) ABSTRACT

Provided is a memory system including a semiconductor memory device including a buffer memory block suitable for storing page data, and including a main memory block, and a controller suitable for generating a combination seed by performing a logical operation on a randomizing seed, a derandomizing seed, and error information, and for providing the generated combination seed to the semiconductor memory device.

18 Claims, 11 Drawing Sheets

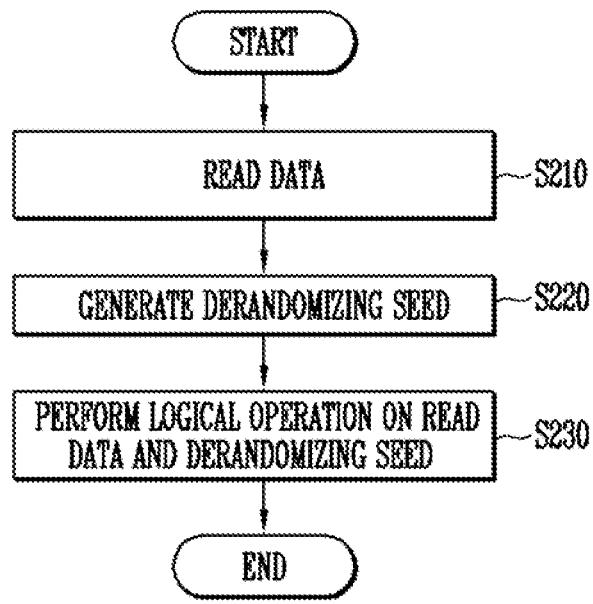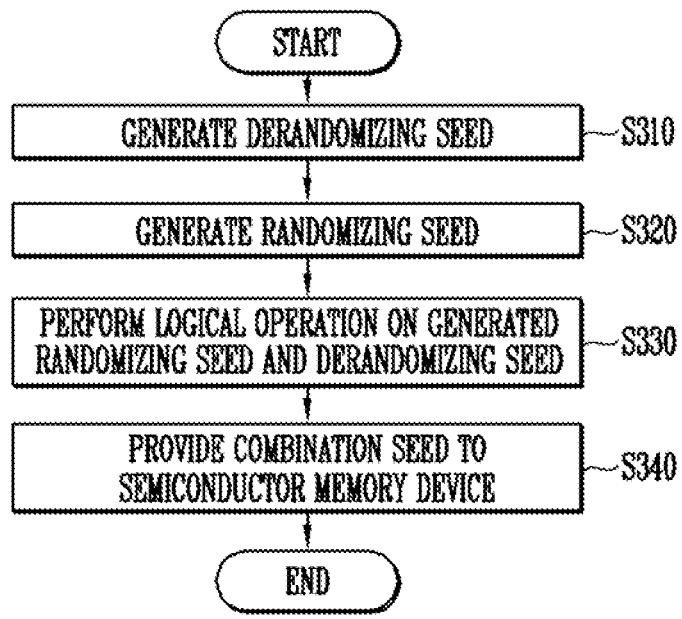

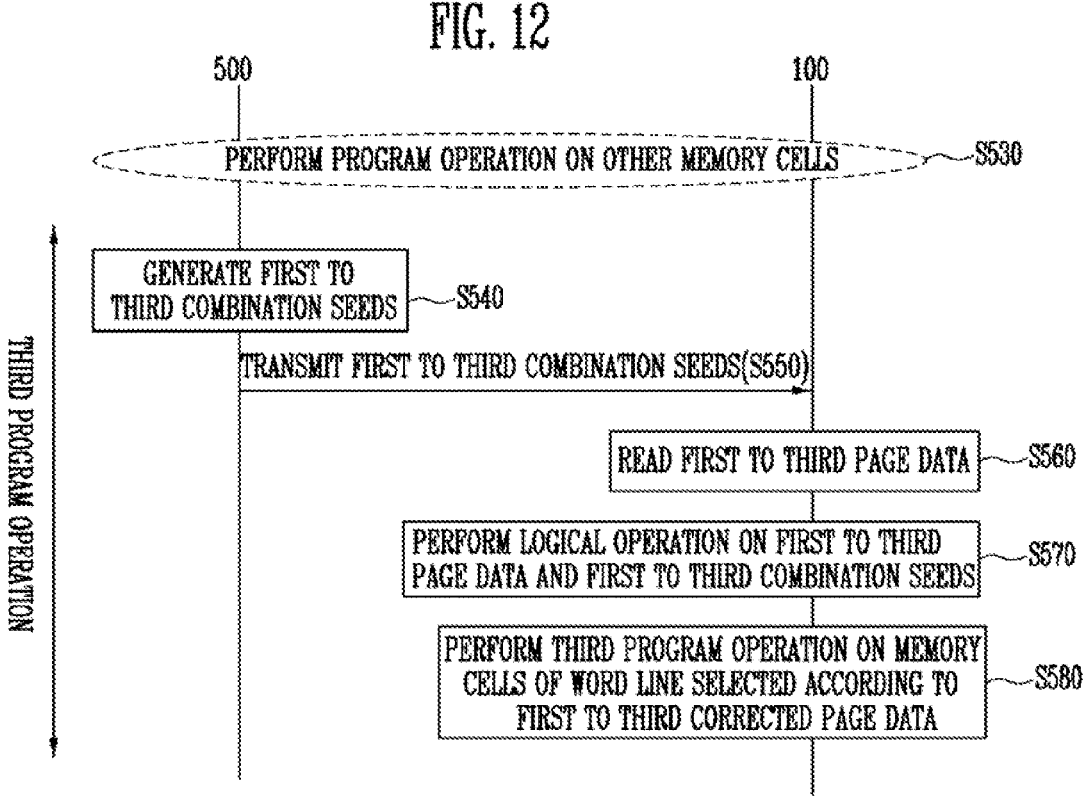
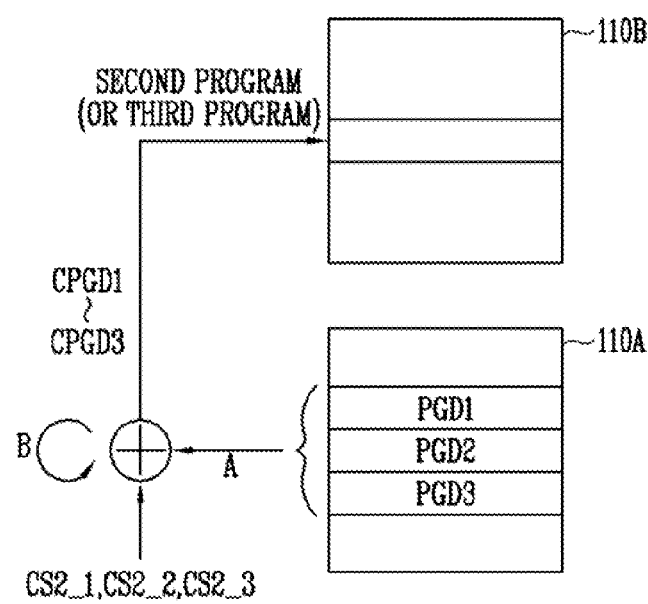

MEMORY SYSTEM INCLUDING RANDOMIZER AND DERANDOMIZER

CROSS-REFERENCE TO RELATED APPLICATION

The present application claims priority to Korean patent application number 10-2013-0149447 filed on Dec. 3, 2013, in the Korean Intellectual Property Office, the entire disclosure of which is incorporated by reference herein.

BACKGROUND

1. Technical Field

Various embodiments of the present invention relate to an electronic device, and more particularly, to a memory system.

2. Related Art

Semiconductor memory devices are storage devices implemented with semiconductors such as silicon (Si), germanium (Ge), gallium arsenide (GaAs), and indium phosphide (InP). Semiconductor memory devices are categorized as volatile memory devices and nonvolatile memory devices.

Volatile memory devices lose stored data when the power supply is cut off. Examples of volatile memory devices include a static RAM (SRAM), a dynamic RAM (DRAM), and a synchronous DRAM (SDRAM). Non-volatile memory devices maintain stored data even when the power supply is cut off. Examples of non-volatile memory devices include a read only memory (ROM), a programmable ROM (PROM), an electrically programmable ROM (EPROM), an electrically erasable and programmable ROM (EEPROM), a flash memory, a phase change RAM (PRAM), a magnetic RAM (MRAM), a resistive RAM (RRAM), a ferroelectric RAM (FRAM), and so on. Flash memories are generally divided into NOR and NAND types.

BRIEF SUMMARY

Various embodiments of the present invention are directed to a memory system having enhanced operating speed and an operating method thereof.

One embodiment of the present invention can be seen in a semiconductor memory device of a memory system including a memory block suitable for storing page data and a main memory block; a controller suitable for generating a combination seed by performing a logical operation on a derandomizing seed of page data, a randomizing seed of a selected region in the main memory block, and error information, and for providing the combination seed to the semiconductor memory device, wherein the semiconductor memory device generates corrected page data by performing a logical operation on the page data and the combination seed, and performs a first program operation on the selected region in the main memory block according to the corrected page data.

Another embodiment of the present invention can be seen in a semiconductor memory device of a memory system including a buffer memory block suitable for storing first to third page data, and including a main memory block; a controller suitable for generating first to third processed data by performing first to third error correction operations based on the first to third page data for providing the first to third processed data to the semiconductor memory device, and for temporarily storing first to third error information obtained from the first to third error correction operations. The semiconductor memory device performs a first program operation on memory cells selected in the main memory block according to the first to third processed data. The controller may generate first to third combination seeds by performing a logical operation on the first to third error information and derandomizing and randomizing seeds, and provide the first to third combination seeds to the semiconductor memory device.

Another embodiment of the present invention can be seen in a semiconductor memory device of a memory system including a first and second memory block, wherein the first memory block stores one or more page data; a controller suitable for generating one or more combination seeds by performing logical operations on one or more pieces of error information, derandomizing seeds, and randomizing seeds, wherein the semiconductor memory device generates one or more corrected page data by performing logical operations on the one or more page data and the combination seed, and performs a first program operation on the second memory block according to the one or more corrected page data, and wherein the controller generates the error information by performing one or more error correction operations on the basis of the one or more page data.

BRIEF DESCRIPTION OF THE DRAWINGS

The above and other features and advantages of the present invention will become more apparent to those of ordinary skill in the art by describing in detail exemplary embodiments with reference to the attached drawings in which:

FIG. 3 is a flowchart showing an operating method of a controller during a read operation for a buffer memory block;

FIG. 4 is a flowchart showing an operating method of a controller according to an embodiment of the present invention;

FIG. 12 is a view illustrating a third program operation for a selected word line of a semiconductor memory device according to an embodiment of the present invention;

FIG. 13 is a conceptual view rating in detail a second or a third program operation;

DETAILED DESCRIPTION

Advantages and features of the present invention, and implementation methods thereof will be clarified through following embodiments described with reference to the accompanying drawings. The present invention may, however, be embodied in different forms and should not be construed as limited to the embodiments set forth herein. Preferred embodiments of the present invention will be described in detail such that a person skilled in the art may carry out the technical idea of the present invention easily.

In this disclosure below, when one part (or element, device, etc.) is referred to as being "connected" to another part (or element, device, etc.), it should be understood that the former can be "directly connected" to the latter, or "indirectly connected" to the latter via an intervening part (or element, device, etc.). In this disclosure, when it is described that one comprises (or includes or has) some elements, it should be understood that it may comprise for include or has) not only those elements but also other elements.

Figure 1:
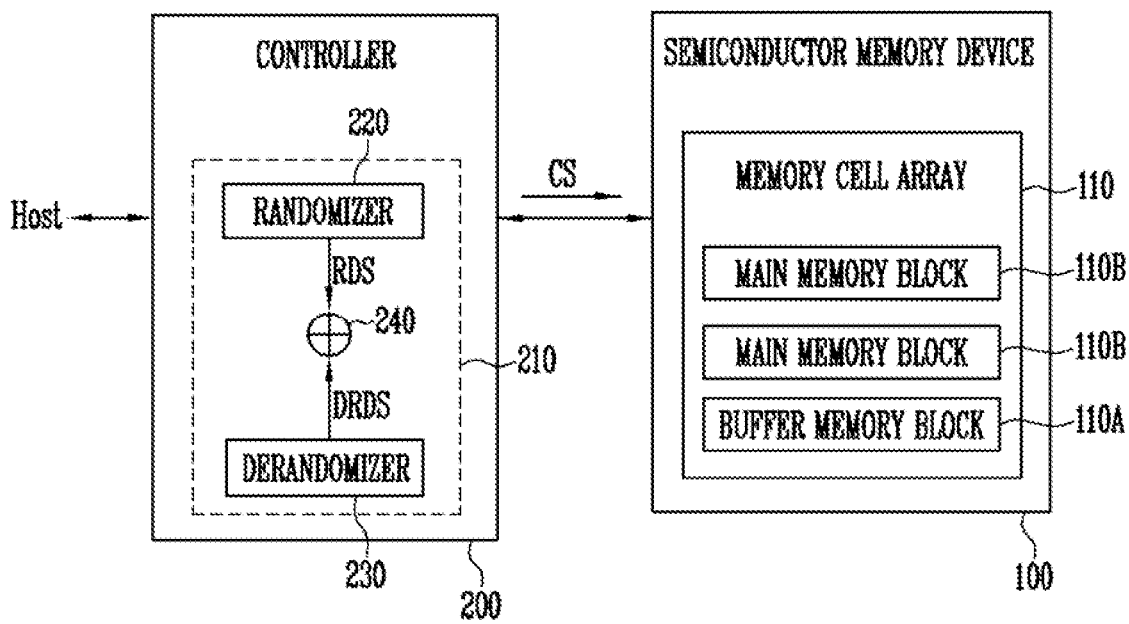
FIG. 1 is a block diagram showing a memory system according to an embodiment of the present invention.
Figure 2:
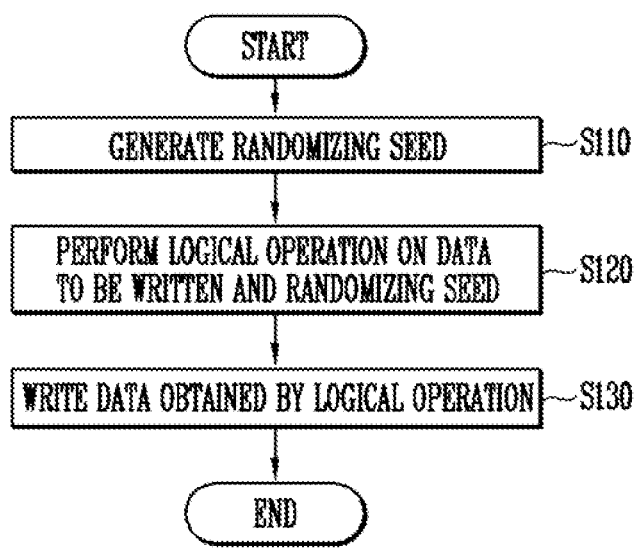
FIG. 2 is a flowchart showing an operating method of a controller during a write operation of a buffer memory block.

FIG. 1 is a block diagram showing a memory system 10 according to an embodiment of the present invention. FIG. 2 is a flowchart showing an operating method of a controller 200 during a write operation for a buffer memory block 110A. FIG. 3 is a flowchart showing an operating method of the controller 200 during a read operation for the buffer memory block 110A.

Referring to FIG. 1, the memory system 10 may include a semiconductor memory device 100 and a controller 200.

The semiconductor memory device 100 may include a memory cell array 110. The memory cell array 110 may include the buffer memory block 110A and a main memory block 110B. Each memory block may be a unit of erase. Each memory block may include a plurality of memory cells.

The main memory block 110B may store data input from an external source, and the buffer memory block 110A may temporarily store data to be input to the main memory block 110B.

The buffer memory block 110A may be required to secure storage speed and reliability of data as the buffer memory block 110A may temporarily store data before it is stored in the main memory block 110B. Each memory cell of the buffer memory block 110A may be defined as a single level cell (SLC) for storing one bit for each memory cell. The main memory block 110B may be required to store large-scale data in its memory cells. Each memory cell of the main memory block 110B may be a multilevel cell (MLC) for storing two bits per memory cell, or a triple level cell (TLC) for storing three bits per memory cell.

The semiconductor memory device 100 may program data to the memory cell array 110 in response to a program request from the controller 200. When a program command, an address, and data are received as a program request from the controller 200 the semiconductor memory device 100 may program data to memory cells according to the address.

In response to a read request from the controller 200, the semiconductor memory device 100 may perform a read operation. When a read command and an address are received as a read request from the controller 200, the semiconductor memory device 100 may read data in memory cells indicated by the address and output the read data to the controller 200.

In addition, the semiconductor memory device 100 may copy data in the buffer memory block 110A of the memory cell array 110 to the main memory block 110B in response to a copy request from the controller 200.

As an example, the semiconductor memory device 100 may be a flash memory device. However, it is understood that the present invention is not limited to the flash memory device.

The controller 200 may interface with the host and the semiconductor memory device 100. The controller 200 may transmit a program request or a read request to the semiconductor memory device 100 according to the control of the host. In addition, the controller 200 may control the semiconductor memory device 100 to perform a copy operation.

The controller 200 may include a seed provision unit 210. The seed provision unit 210 may include a randomizer 220, derandomizer 230, and a logical operation block 240.

The randomizer 220 and the derandomizer 230 may provide a randomizing seed RDS and a derandomizing seed DRDS corresponding to a memory region to be accessed (for example, programmed or read) in the memory cell array 110, respectively.

As an example, each of the randomizing seed RDS and the derandomizing seed DRDS may be different for each page to be accessed. As another example, each of the randomizing seed RDS and the derandomizing seed DRDS may be different for each memory block to be accessed.

During the program operation, the randomizer 220 may be activated. Referring to FIG. 2, in step S110, the randomizer 220 may generate the randomizing seed RDS corresponding to a memory region to be programmed during the program operation. That is, the randomizer 220 may generate the randomizing seed RDS corresponding to the memory region based on the address provided to the semiconductor memory device 100.

Subsequently, the controller 200 may perform a logical operation on data received from the host and the randomizing seed RDS generated by the randomizer 220 in step S120 and program the data obtained by the logical operation to the memory block of the semiconductor memory device in step S130.

As is known, data obtained by the logical operation on the randomizing seed RDS may be programmed to the memory cell array 110, thereby improving threshold voltage distribution of the memory cells in the memory cell array 110 and enhancing reliability of data stored in the memory cells.

During the read operation, the derandomizer 230 is activated. Referring to FIG. 3, during the read operation, the controller 200 may transmit a read command and an address to the semiconductor memory device 100, and receive data corresponding to the address of the memory cell array 110 in step S210. Subsequently, a derandomizing seed corresponding to the read region may be generated in step S220. That is, the derandomizer 230 may generate the derandomizing seed DRDS based on the address for the read operation.

The controller 200 may then perform a logical operation on the read data and the derandomizing seed DRDS in step S230. In addition, the data obtained by the logical operation may be transmitted to the host.

Referring back to FIG. 1, the memory system 10 may read data from a specific memory block of the semiconductor memory device 100 and program the read data to another memory block (hereinafter, the combination of the read operation and the program operation are referred to as a copy operation). For example, the memory system 10 may read data, which is from the host and temporarily stored in the buffer memory block 110A, and program the read data on the main memory block 110B.

As an example, during the copy operation data read from the buffer memory block 110A may be transmitted to the controller 200. In this case, the controller 200 may perform a first logical operation on the derandomizing seed DRDS and the transmitted data and perform a second logical operation on the data obtained by the first logical operation and the randomizing seed RDS. The controller 200 may transmit the data obtained by the second logical operation to the semiconductor memory device 100 to program the data to the main memory block 110B.

For example, the data to be programmed to the main memory block 110B may be obtained using Equation (1).

$$CPGD(PGD \veebar DRDS) \veebar RDS \quad (1)$$

Referring to Equation (1), PGD indicates data of one page (hereinafter, referred to as page data) read from the buffer memory block 110A, and CPGD indicates data (hereinafter, referred to as corrected page data) to be programmed to the main memory block 110B. The controller 200 may perform a first logical operation on the page data PGD and the derandomizing seed DRDS and then perform a second logical operation on the data obtained by the first logical operation and the randomizing seed RDS to generate the corrected page data CPGD. The logical operations may be, for example, XOR operations.

According to this method, after the page data PGD is transmitted from the semiconductor memory device 100 to the controller 200, the controller 200 may process the page data PGD into the corrected page data CPGD as expressed in Equation (1), and may allow the corrected page data CPGD to be transmitted to the semiconductor memory device 100. As a result, it may take time to transmit and receive the page data PGD and the corrected page data CPGD between the semiconductor memory device 100 and the controller 200.

As another example, as shown in FIG. 1, the controller 200 may include the logical operation block 240 for performing a logical operation on the derandomizing seed DRDS corresponding to a memory region, where the page data PGD may be stored in the buffer memory block 110A, and the randomizing seed RDS corresponding to a memory region to be copied in the main memory block 110E in order to generate a combination seed CS. The combination seed CS may be provided to the semiconductor memory device 100. The main semiconductor memory device 100 may perform a logical operation on the page data PGD and the combination seed CS to generate corrected page data CPGD.

For example, the corrected page data CPGD may be obtained using Equation (2) and Equation (3).

$$CS = DRDS \veebar RDS \quad (2)$$

$$CPGD = PGD \veebar CS \quad (3)$$

In Equation (2) and Equation (3), unlike Equation (1) a first logical operation may be performed on the derandomizing seed DRDS and the randomizing seed RDS to derive the combination seed CS, and then a second logical operation may be performed on the combination seed CS and the page data PGD.

As a result, the semiconductor memory device 100 may read the page data PGD from the buffer memory block 110A and perform a logical operation on the page data PGD and the combination seed CS to generate the corrected page data CPGD.

According to this embodiment, it may take less time to transmit and receive the page data PGD and the corrected page data CPGD between the semiconductor memory device 100 and the controller 200 during a copy operation. Thus, the speed of the copy operation may be improved.

FIG. 4 is a flowchart showing an operating method of a controller 200 according to an embodiment of the present invention.

Referring to FIGS. 1 and 4, in step S310, the controller 200 may generate the derandomizing seed DRDS corresponding to a memory region where the page data PGD is stored in the buffer memory block 110A. In step S320, the controller 200 may generate the randomizing seed RDS corresponding to a memory region where the corrected page data CPGD is to be stored in the main memory block 110B.

In step S330, the controller 200 may perform a logical operation on the derandomizing seed DRDS and the randomizing seed RDS to generate a combination seed CS. For example, an XOR operation may be performed.

In step S340, the controller 200 transmits the combination seed CS together with the copy request to the semiconductor memory device 100. The copy request may include a copy command, an address of the memory region where the page data PGD may be stored in the buffer memory block 110A, and an address of the memory region where the corrected page data CPGD is to be stored in the main memory block 110B. In response to the copy request, the semiconductor memory device 100 internally may perform the copy operation.

Figure 5:
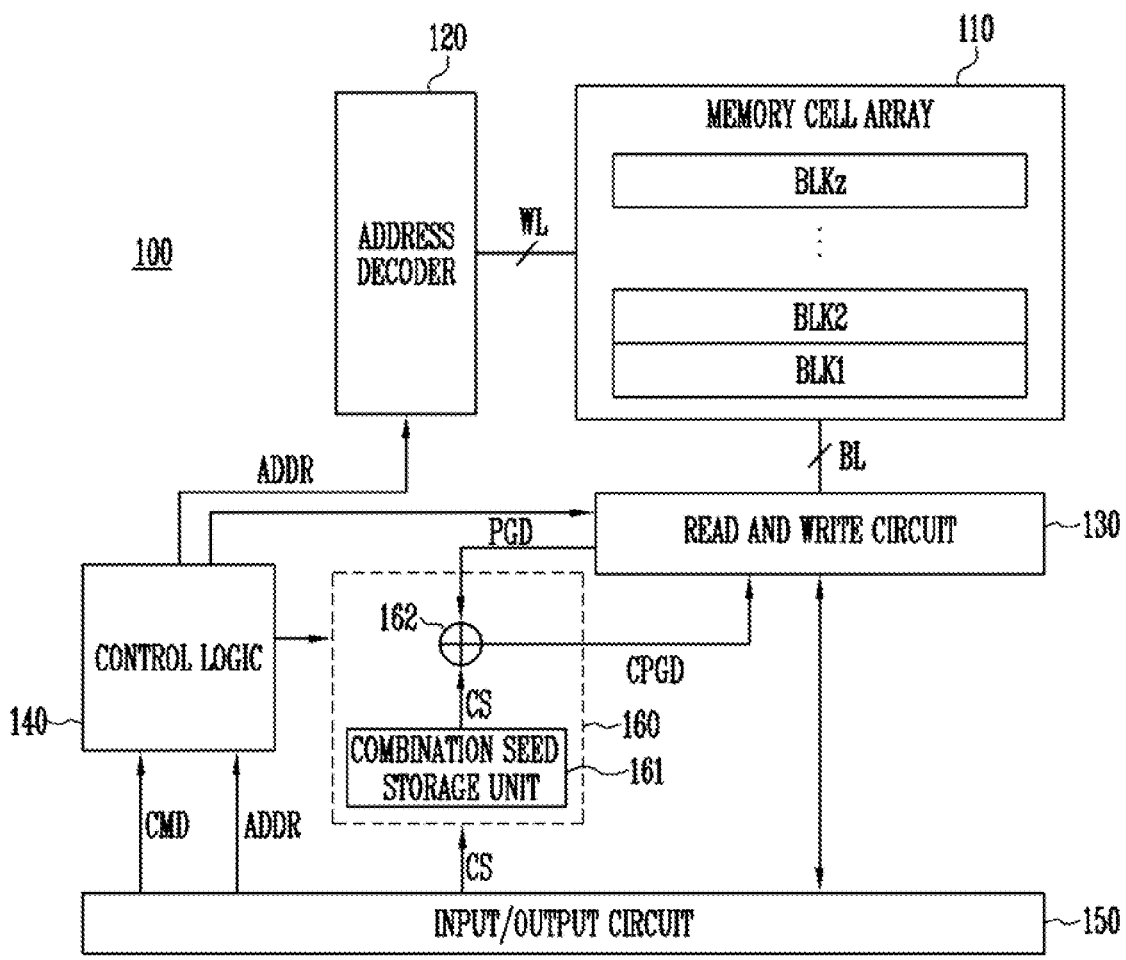
FIG. 5 is a block diagram showing a semiconductor memory device according to an embodiment of the present invention.
Figure 6:
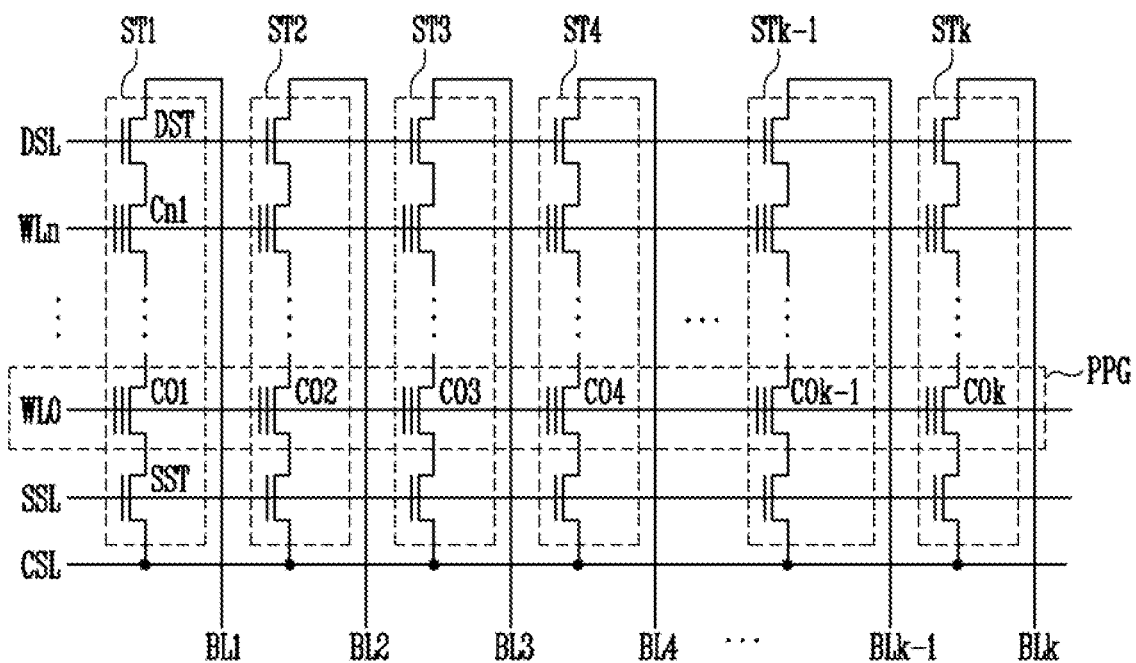
FIG. 6 is a circuit diagram showing one of a plurality of memory blocks.

FIG. 5 is a block diagram showing a semiconductor memory device 100 according to an embodiment of the present invention. FIG. 6 is a circuit diagram showing one of a plurality of memory blocks BLK1 to BLKz.

Referring to FIG. 5, the semiconductor memory device 100 may include the memory cell array 110, an address decoder 120, a read and write circuit 130, a control logic 140, an input/output circuit 150, and a data processor 160.

The memory cell array 110 may include a plurality of memory blocks BLK1 to BLKz. Some (for example, BLK1) of the plurality of memory blocks BLK1 to BLKz may be defined as the buffer memory block 110A (See FIG. 1). The remaining memory blocks (for example, BLK2 to BLKz) of the plurality of memory blocks BLK1 to BLKz may be defined as the main memory block 110B (See FIG. 1). Each of memory cells of the memory block defined as the buffer memory block 110A may operate as the SLC. Each of memory cells of the memory blocks defined as the main memory block 110B may operate as the MLC or the TLC.

The plurality of memory blocks BLK1 to BLKz may be connected to the address decoder 120 through word lines WL and connected to the read and write circuit 130 through bit lines BL.

Referring to FIG. 6, each memory block may include a plurality of memory strings ST0 to STk connected between the bit lines BL0 to BLk and a common source line CSL. That is, the memory strings ST0 to STk may be connected with the bit lines BL0 to BLk, respectively, and commonly connected with the common source link CSL. Each memory string may include a source select transistor SST having a source connected to the common source line CSL, a cell string connected in series to a plurality of memory cells C00 to Cn0, and a drain select transistor DST having a drain connected to the bit lines. The memory cells C00 to Cn0 included in the cell string may be connected in series between the select transistors SST and DST. A gate of the source select transistor SST may be connected to a source select line SSL, gates of the memory cells C00 to Cn0 may be connected to the word lines WL0 to WLn, and a gate of the drain select transistor DST may be connected to a drain select line DSL.

The drain select transistor DST controls connection or disconnection between the cell strings C00 to Cn0 and the bit lines, and the source select transistor SST controls connection or disconnection between the cell strings C00 to Cn0 and the common source line CSL.

Memory cells C01 to C0k connected to one word line (for example, WL0) form one physical page. The one physical page may include at least one logical page. For a flash memory device operating in an MLC mode, the physical page may include a least significant bit (LSB) page for storing LSB data and a most significant bit (MSB) page for storing MSB data. In addition, for a flash memory device operating in a TLC mode, the physical page may include an LSB page for storing LSB data, a central significant bit (CSB) page for storing CSB data, and an MSB page for storing MSB data. In this case, each of the LSB page, the CSB page, and the MSB page corresponds to a logical page. This page (physical page or logical page) may be a unit of program operation or read operation, and the memory block may be a unit of erase operation.

One physical page of the buffer memory block 110A may include one logical page. One physical page of the main memory block 110B may include two or more logical pages.

Referring back to FIG. 5, the address decoder 120, the read and write circuit 130, the control logic 140, the input/output circuit 150, and the data processor 160 may operate as peripheral circuits for driving the memory cell array 110.

The address decoder 120 may be connected to the memory cell array 110 through word lines WL. The address decoder 120 may operate in response to control of the control logic 140. The address decoder 120 may receive addresses ADDR through the control logic 140.

The address decoder 120 may decode a block address among the received addresses ADDR. The address decoder 120 may select a block from the plurality of memory blocks BLK1 to BLKz according to the decoded block address The address decoder 120 may decode a row address among the received addresses ADDR. The address decoder 120 may select a word line from the plurality of word lines of memory blocks according to the decoded row address.

The address decoder 120 may include an address buffer, a block decoder, and an address decoder, etc.

The read and write circuit 130 may be connected to the memory cell array 110 through bit lines BL. The read and write circuit 130 may operate in response to control of the control logic 140.

The read and write circuit 130 may program the data, which is received through the input/output circuit 150, to the memory cells of the selected word line during the program operation, read data from the memory cells of the selected word line during the read operation, and output the read data to the input/output circuit 150.

In the copy operation, the read and write circuit 130 may read the page data PGD from the memory cells selected among the buffer memory block 110A (See FIG. 1), and provide the page data PGD to the data processor 160. In addition, the read and write circuit 130 may receive the corrected page data CPGD corrected by the data processor 160 and program the corrected page data CPGD to memory cells selected among the main memory block 110B (See FIG. 1).

As an example, the read and write circuit 130 may include a plurality of page buffers.

The control logic 140 may receive a command CMD and the address ADDR from the input/output circuit 150. The control logic 140 may transfer the received address ADDR to the address decoder 120. In addition, the control logic 140 may control the address decoder 120, the read and write circuit 130, the input/output circuit 150, and the data processor 160 in response to the received command CMD.

The input/output circuit 150 may be connected to the read and write circuit 130 and the control logic 140. The input/output circuit 150 may operate in response to control of the control logic 140. The input/output circuit 150 may receive the command CMD and the address ADDR from the controller 200 (See FIG. 1) and transmit the received command CMD and address ADDR to the control logic 140.

According to an embodiment of the present invention, the semiconductor memory device 100 may include a data processor 160. The data processor 160 may operate in response to control of the control logic 140.

The data processor 160 may include a combination seed storage unit 161 and a logical operation block 162. The combination seed storage unit 161 may temporarily store the combination seed CS provided from the controller 200 through the input/output circuit 150. The combination seed CS stored in the combination seed storage unit 161 may be provided to the logical operation block 162.

The logical operation block 162 may perform a logical operation on the page data PGD and the combination seed CS in response to control of the control logic 140. For example, the logical operation block 162 may perform an XOR operation. As a result of the logical operation, the corrected page data CPGD may be generated. The corrected page data CPGD may be provided to the read and write circuit 130.

According to an embodiment of the present invention, the semiconductor memory device 100 may internally generate the corrected page data CPGD based on the combination seed CS. Accordingly, the page data PGD and the corrected page data CPGD do not have to be transmitted and received between the semiconductor memory device 100 and the controller 200 during the copy operation. As a result, the speed of the copy operation may be improved.

Figure 7:
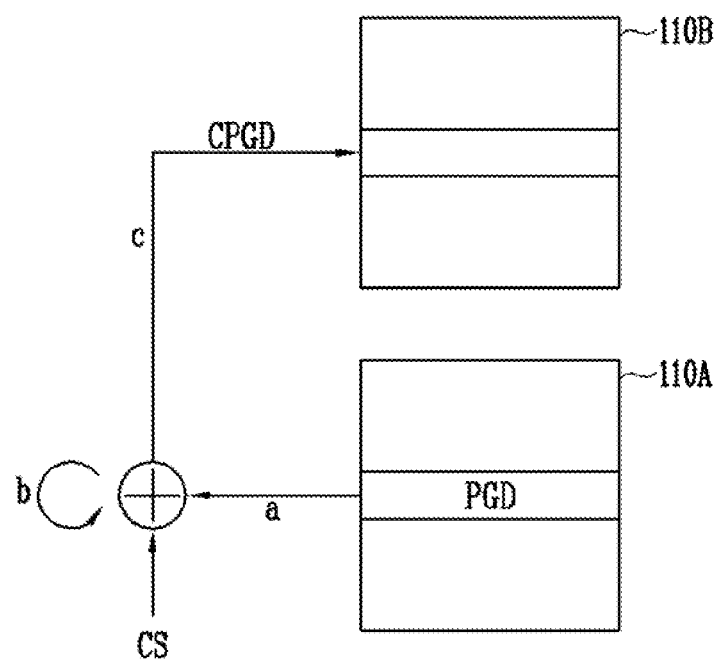
FIG. 7 is a conceptual view illustrating in detail a copy operation.

FIG. 7 is a conceptual view illustrating in detail the copy operation.

Referring to FIG. 7, the corrected page data CPGD may be generated by reading page data PGD from memory cells selected in the buffer memory block 110A (a) and performing a logical operation on the read page data PGD and the combination seed CS (b). Then, the copy operation may be performed by writing the corrected page data CPGD to memory cells selected in the main memory block 110B (c).

Figure 8:
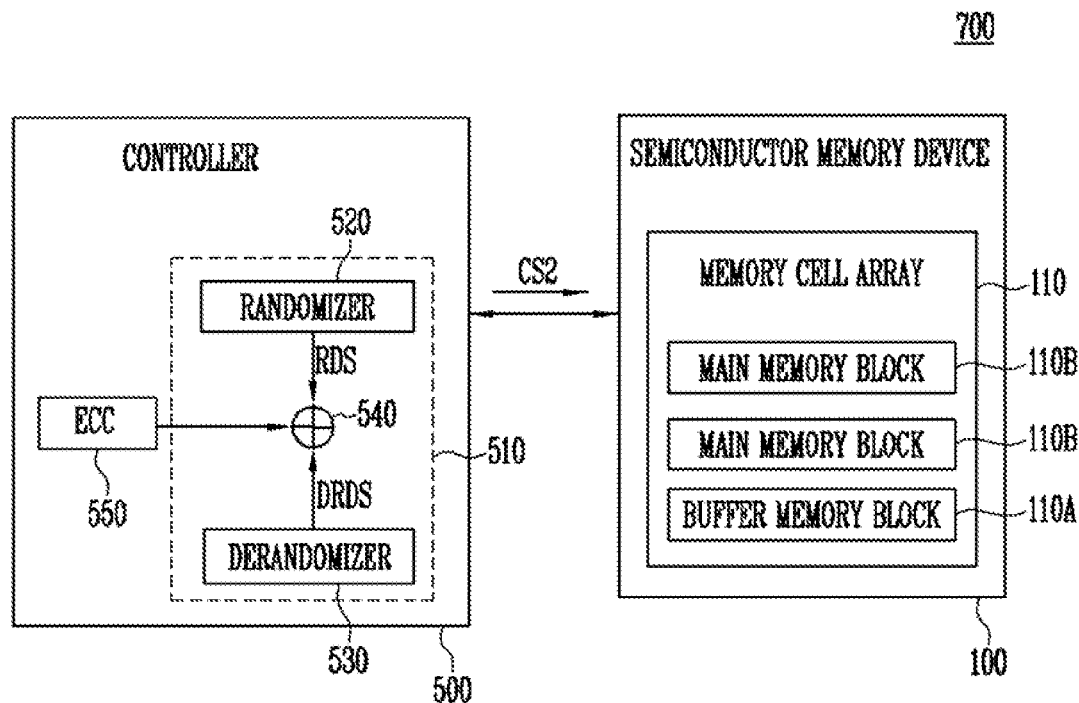
FIG. 8 is a block diagram showing a memory system according to another embodiment of the present invention.

FIG. 8 is a block diagram showing a memory system 700 according to another embodiment of the present invention.

Referring to FIG. 8, the memory system 700 may include a semiconductor memory device 100 and a controller 500.

The semiconductor memory device 100 may include a memory cell array 110 including a buffer memory block 110A and a main memory block 110B.

The controller 500 may include a seed provision unit 510. The seed provision unit 510 may include a randomizer 520, derandomizer 530, and a logical operation block 540. The seed provision unit 510 may be the same as the seed provision unit 210 described with reference to FIG. 1, except the logical operation block 540 may receive error information ER. Hereinafter, repetitive descriptions will be omitted.

According to an embodiment of the present invention, the logical operation block 540 may receive a randomizing seed RDS from the randomizer 520 and may receive a derandomizing seed DRDS from the derandomizer 530. In addition, the logical operation block 540 may further receive error information ER from an error correction block 550.

The error information ER may include position information about an error bit included in the page data. For example, the error information ER may be the same size as the page data, and have a logical value of "1" at a position of an error bit of the page data and a logical value of 0 at a position of a normal bit of the page data. Alternatively, the error information ER may have a logical value of "0" at a position corresponding to an error bit of the page data and a logical value of "1" at a position corresponding to a normal bit of the page data.

The logical operation block 540 may perform a logical operation on a randomizing seed RDS, a derandomizing seed DRDS, and error information ER to generate a combination seed CS2. The generated combination seed CS2 may be provided to the semiconductor memory device 100.

The semiconductor memory device 100 may read page data from the buffer memory block 110A and perform a logical operation on the page data and the combination seed CS2 provided from the controller 200 to generate corrected page data CPGD2.

In an example described with reference to FIGS. 1 to 7, since the page data PGD (See FIG. 5) may not be provided to the controller 200 (See FIG. 1), an error in the corrected page data CPGD (See FIG. 5) programmed to the main memory block 110B during the copy operation may not be corrected. According to an embodiment shown in FIG. 8, an error in the corrected page data stored in the main memory block 110B may be corrected.

For example, the corrected page data CPGD2 may be obtained using Equation (4) and Equation (5).

$$CS2 = DRDS \veebar RDS \veebar ER \quad (4)$$

$$CPGD2 = PCD \veebar CS2 \quad (5)$$

In Equation (4), a first logical operation may be performed on the randomizing seed RDS, the derandomizing seed DRDS, and the error information ER to derive the combination seed CS2. Subsequently, referring to Equation (5), a second logical operation may be performed on the page data PGD and the combination seed CS2 to derive corrected page data CPGD2. In this case, the logical operation may be an XOR operation.

It is assumed that the page data PGD stored in the buffer memory block 110A may be transmitted to the controller 500 for the copy operation. The corrected page data CPGD2 may be obtained using Equation (6).

$$CPGD2 = (PGD \veebar DRDS) \veebar ER) \veebar RDS \quad (6)$$

Referring to Equation (6), the corrected page data CPGD2 may be generated by performing a first logical operation on the page data PGD and the derandomizing seed DRDS, performing a second logical operation (for example, XOR operation) on the data obtained by the first operation and the error information ER, and performing a third logical operation on the data obtained by the second operation and the randomizing seed RDS. According to this method, after the page data PGD is transmitted from the semiconductor memory device 100 to the controller 500, the controller 500 may process the page data PGD into the corrected page data CPGD2 as expressed in Equation (6) and allow the corrected page data CPGD2 to be transmitted to the semiconductor memory device 100. As a result, it may take time to transmit and receive the page data PGD and the corrected page data CPGD2 between the semiconductor memory device 100 and the controller 500.

The controller 500 according to an embodiment of the present invention may perform a first logical operation on the randomizing seed RDS, the derandomizing seed DRDS, and the error information ER to generate the combination seed CS2, and transmit the generated combination seed CS2 to the semiconductor memory device 100. The semiconductor memory device 100 may perform a second logical operation on the page data PGD and the combination seed CS2 to generate the corrected page data CPGD2. As a result, it may not take as much time to transmit and receive the page data PGD and the corrected page data CPGD2 between the semiconductor memory device 100 and the controller 500 during the copy operation. Thus, the speed of the copy operation may be improved.

Figure 9:
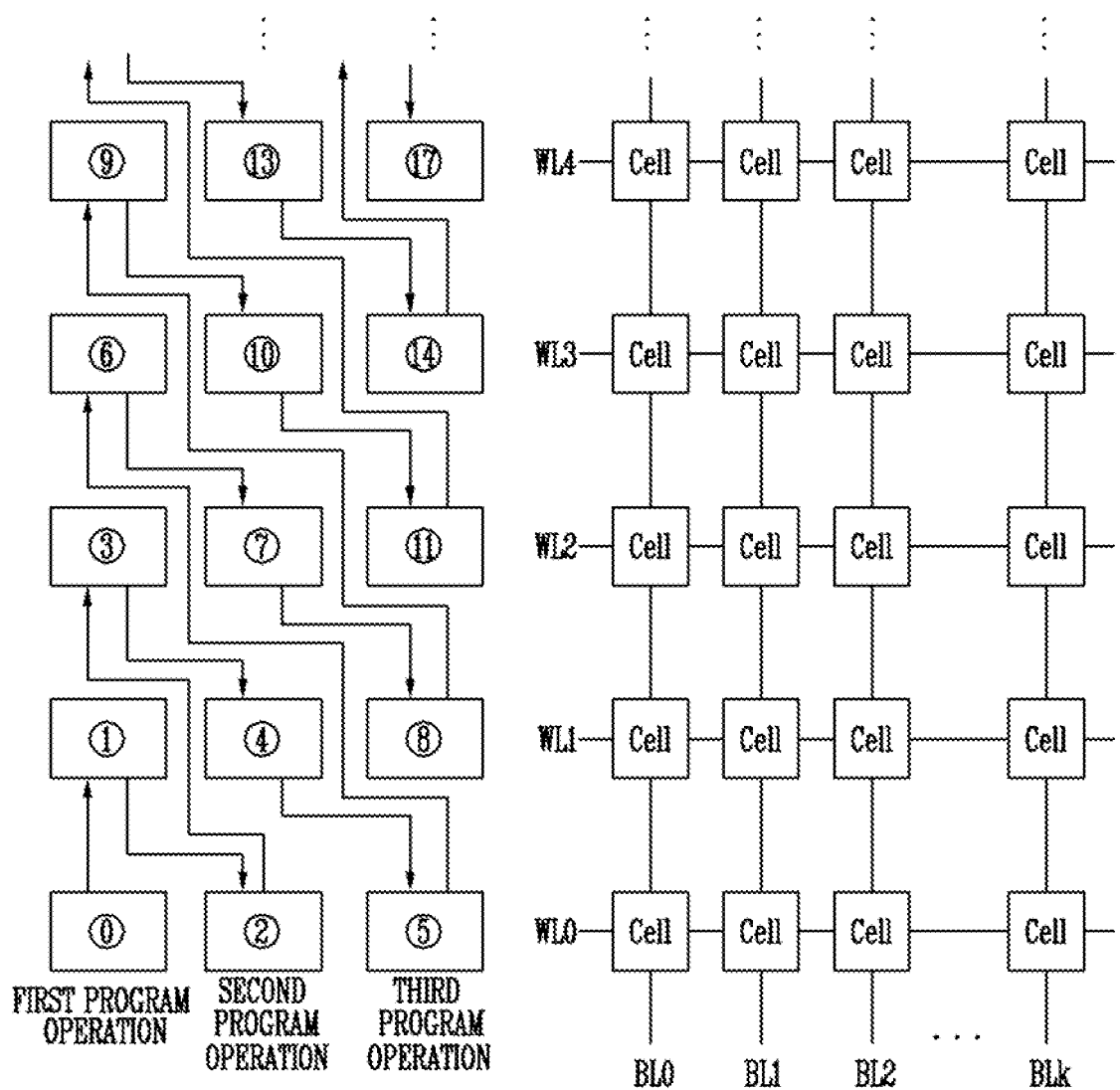
FIG. 9 is a illustrates a program sequence for a main memory block of a semiconductor memory device according to an embodiment of the present invention.
Figure 10:
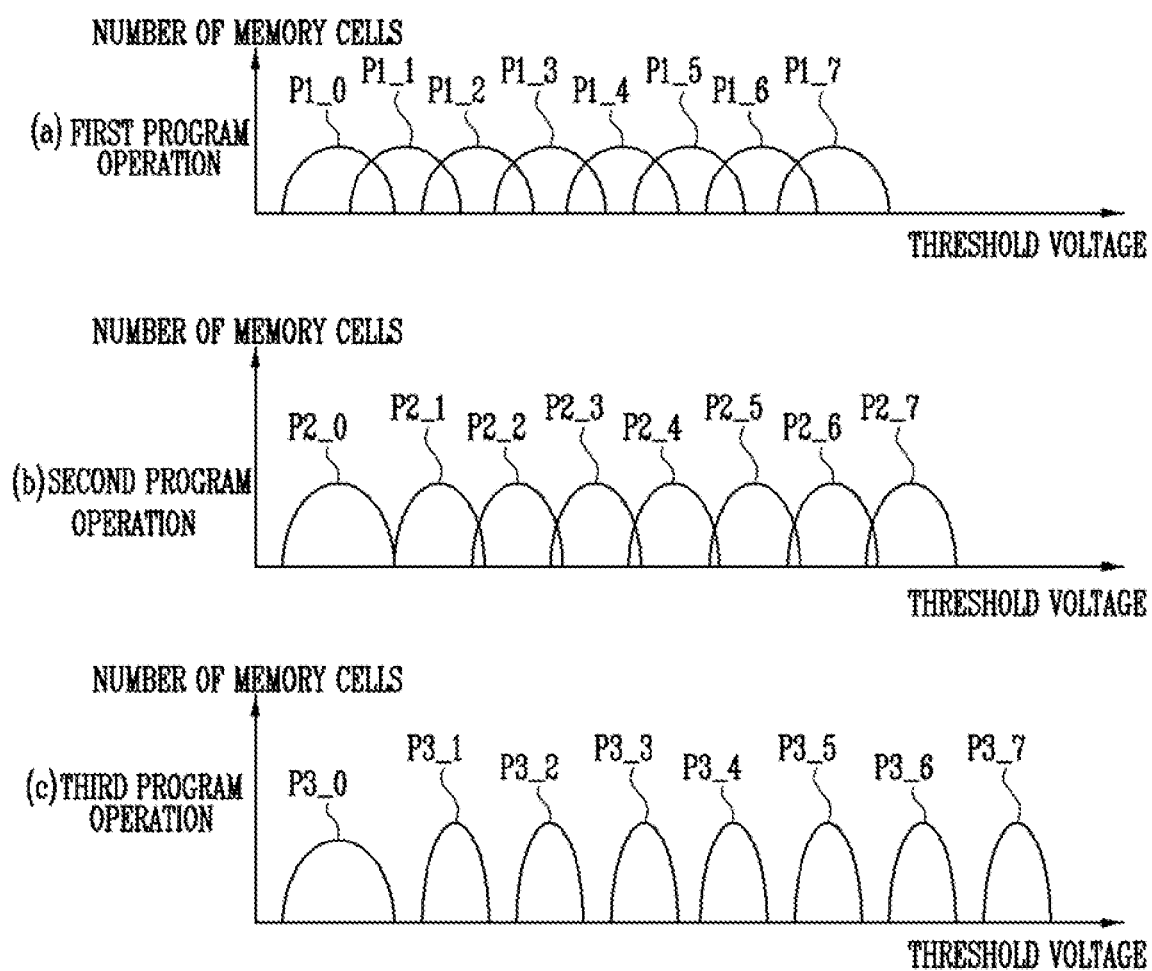
FIG. 10 is a shows a threshold voltage distribution of memory cells connected to a selected word line according to first to third program operations.

FIG. 9 is a view illustrating a program sequence for the main memory block 110B of the semiconductor memory device 100 according to an embodiment of the present invention. FIG. 10 is a view showing threshold voltage distribution of memory cells connected to a selected word line according to first to third program operations.

Referring to FIG. 9, when the main memory block 110B may operate in a TLC mode, first to third program operations may be performed on the memory cells of each word line. While a program operation may be performed on memory cells of an adjacent word line, interference occurs between the memory cells of the selected word line which may unintentionally change threshold voltages of the memory cells of the selected word line.

To prevent interference, a sequence of the first to third program operations for the memory cells of each of word lines WL0 to WL4 may be determined as shown in FIG. 9, thereby minimizing the fluctuation of the threshold voltage due to the interference. For example, if the second word line WL2 is the selected word line, a first program operation for the selected word line WL2, a second program operation for the first word line WL1, a third program operation for the zero-th word line WL0, a first program operation for the third word line WL3, a second program operation of the selected word line WL2, a third program operation for the first word line WL1, a first program operation for the fourth word line WL4, a second program operation for the third word line WL3, and a third program operation for the selected word line WL2 may be sequentially carried out.

When the first program operation may be performed on the selected word line, LSB data, CSB data, and MSB data may be input to the semiconductor memory device 100. The read and write circuit (See 130 of FIG. 5) of the semiconductor memory device 100 may program the LSB data, the CSB data, and the MSB data to the memory cells of a selected word line. For example, a one-shot program may be performed on the memory cells of the selected word line.

Referring to FIG. 10a, during the first program operation, the memory cells of the selected word line may have eight threshold voltage distributions P1_0 to P1_7. The threshold voltage distributions P1_0 to P1_7 may have a width greater than and a voltage level lower than the final target voltage distributions P3_0 to P3_7 shown in FIG. 10c.

When a second program operation is performed on the selected word line, like the first program operation, the LSB data, the CSB data, and the MSB data may be input to the semiconductor memory device 100, and the memory cells of the selected word line may be programmed. For example, the read and write circuit 130 may perform a one-shot program on the memory cells of the selected word line.

Referring to FIG. 10b, during the second program operation the memory cells of the selected word line may have eight threshold voltage distributions P2_0 to P2_7. The threshold voltage distributions P2_0 to P2_7 may have a width slightly greater than and a voltage level slightly lower than the final target voltage distributions P3_0 to P3_7 shown in FIG. 10c.

When a third program operation is performed on the selected word line, like the first program operation, the LSB data, the CSB data, and the MSB data may be input to the semiconductor memory device 100, and the memory cells of the selected word line may be programmed. For example, a one-shot program may be performed on the memory cells of the selected word line.

Referring to FIG. 10c, during the third program operation, the memory cells of the selected word line may have the final target voltage distributions P3_0 to P3_7.

When data in the buffer memory block 110A (See FIG. 8) is copied to the main memory block 110B (See FIG. 8), three-page data in the buffer memory block 110A (See FIG. 8) may be copied by the first to third program operations for memory cells of one word line in the main memory block 110B. That is, the three-page data in the buffer memory block 110A may be copied to the memory cells of one word line of the main memory block 110B, as the LSB data, the CSB data, and the MSB data. In the second and third program operations, the combination seed CS2 may be provided to the semiconductor memory device 100 (See FIG. 8). It will be described in more detail as follows.

Figure 11:
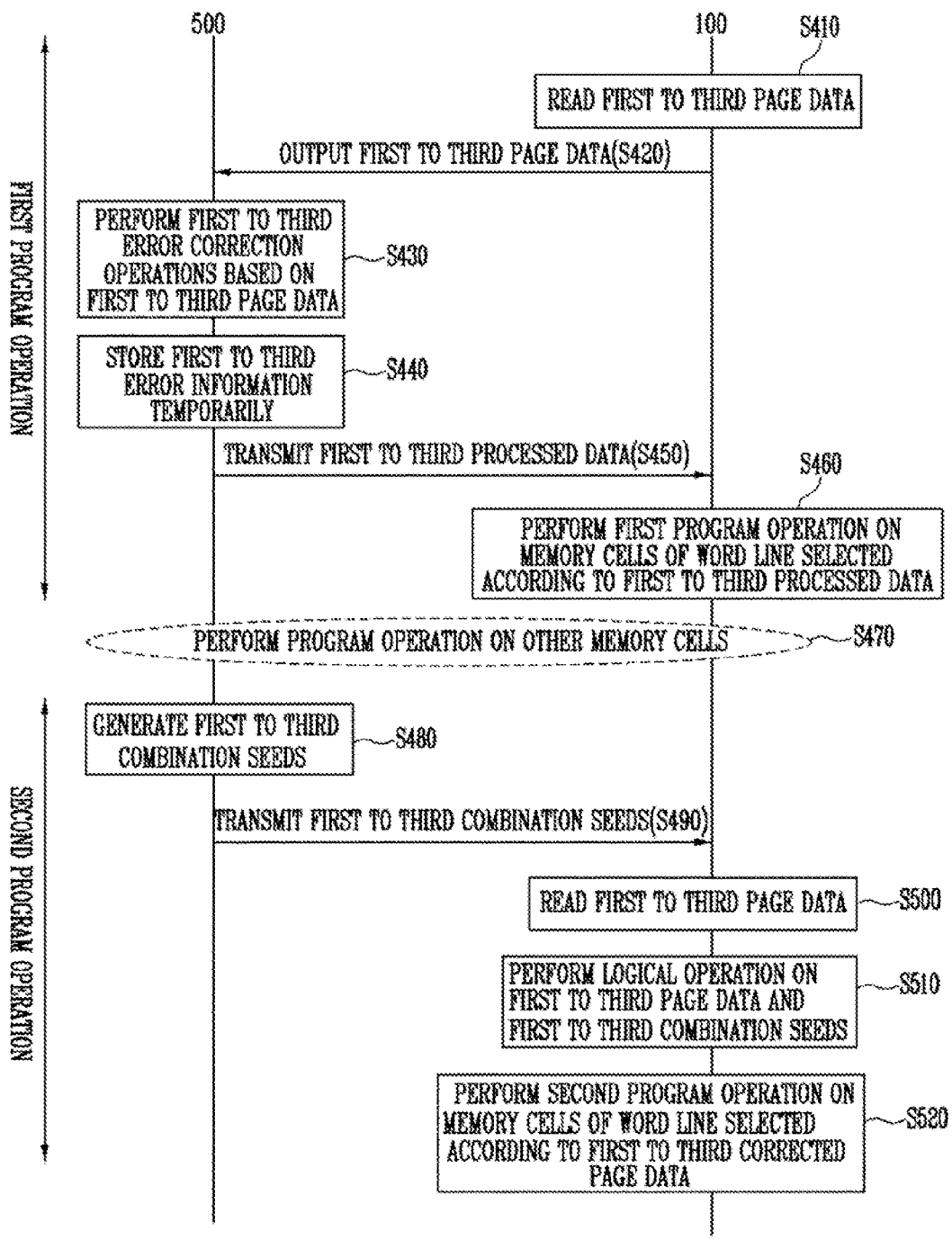
FIG. 11 is a view illustrating first and second program operations for a selected word line of a semiconductor memory device according to an embodiment of the present invention.

FIG. 11 is a view illustrating first and second program operations for a selected word line of a semiconductor memory device 100 according to an embodiment of the present invention.

Referring to FIGS. 5, 8, and 11, the first program operation may be performed on the selected word line in steps S410 to S460. In step S410, the semiconductor memory device 100 may read first to third page data stored in the buffer memory block 110A. In step S420, the read first to third page data may be transmitted to the controller 500.

In step S430, the controller 500 may perform first to third error correction operations on the basis of the first to third page data. More specifically, a logical operation may be performed on the first page data and the derandomizing seed DRDS, and a first error correction operation may be performed on data obtained by the logical operation (hereinafter, referred to as first raw data). Thus, an error in the first raw data may be corrected. First error information may be generated during the first error correction operation, and second raw data may be generated by performing a logical operation (for example, an XOR operation) on the first error information and the first raw data. Subsequently, a logical operation may be performed on the second raw data and the randomizing seed RDS to derive first processed data.

Likewise, a logical operation may be performed on the second page data and the derandomizing seed DRDS, and a second error correction operation may be performed on data obtained by the logical operation (hereinafter, referred to as third raw data). Thus, an error in the third raw data may be corrected. Second error information may be generated according to the second error correction operation, and fourth raw data may be generated by performing a logical operation (for example, an XOR operation) on the second error information and the third data. Subsequently, a logical operation may be performed on the fourth raw data and the randomizing seed RDS to derive second processed data.

A logical operation may be performed on the third page data and the derandomizing seed DRDS, and a third error correction operation may be performed on data obtained by the logical operation (hereinafter, referred to as fifth raw data) to generate sixth raw data. Third error information may be generated according to the third error correction operation. Subsequently, a logical operation may be performed on the sixth raw data and the randomizing seed RDS to derive third processed data.

As described above, the first to third error correction operations may be performed on the basis of the first to third page data during the first program operation. In step S440 the generated first to third error may be stored in the controller 500.

In step S450, the controller 500 may transmit the first to third processed data to the semiconductor memory device 100.

In step S460, the semiconductor memory device 100 may perform the first program operation on the memory cells of the selected word line according to the first to third processed data. The memory cells of the selected word line according to the first program operation may have threshold voltage distributions P1_0 to P1_7 as shown in FIG. 10a.

In step S470, a program operation may be performed on memory cells of another word line.

In steps S480 to S520, the second program operation may be performed on the selected word line. In step S480 the controller 500 may generate first to third combination seeds.

The controller 500 may perform a logical operation on the randomizing seed RDS and the derandomizing seed DRDS on each of the first to third error information stored in step S440 to generate the first to third combination seeds.

A logical operation may be performed on the derandomizing seed DRDS corresponding to a memory region, where the first error information and the first page data may be stored, and the randomizing seed RDS corresponding to a selected word line of the main memory block 110B in order to generate the first combination seed. A logical operation may be performed on the derandomizing seed DRDS corresponding to a memory region, where the second error information and the second page data may be stored, and the randomizing seed RDS corresponding to the selected word line of the main memory block 110B in order to generate the second combination seed. A logical operation may be performed on the derandomizing seed DRDS corresponding to a memory region, where the third error information and the third page data may be stored, and the randomizing seed RDS corresponding to the selected word line of the main memory block 110B in order to generate the third combination seed.

In step S490, the controller 500 may transmit the generated first to third combination seeds to the semiconductor memory device 100. The first to third combination seeds may be stored in the combination seed storage unit 161 of the semiconductor memory device 100.

In step S500, the semiconductor memory device 100 may read first to third page data from the buffer memory block 110A. In step S510, the semiconductor memory device 100 may perform logical operations on the first to third page data and the first to third combination seeds in order to generate first to third corrected page data.

The logical operation block 162 may perform a logical operation on the first page data from the read and write circuit 130 and the first combination seed from the combination seed storage unit 161 to generate the first corrected page data. The logical operation block 162 may perform a logical operation on the second page data from the read and write circuit 130 and the second combination seed from the combination seed storage unit 161 to generate the second corrected page data. The logical operation block 162 may perform a logical operation on the third page data from the read and write circuit 130 and the third combination seed from the combination seed storage unit 161 to generate the third corrected page data.

In step S520, the second program operation may be performed on the memory cells of the selected word line according to the first to third corrected page data. The memory cells of the selected word line according to the second program operation may have threshold voltage distributions P2_0 to P2_7 as shown in FIG. 10b.

FIG. 12 is a view illustrating a third program operation for a selected word line of a semiconductor memory device 100 according to an embodiment of the present invention.

Referring to FIGS. 5, 8, and 12, the program operation may be performed on memory cells of another word line after the second program operation in step S530.

In operations S540 to S580, the third program operation may be performed on the selected word line. The third program operation may be performed similarly to the second program operation described with reference to FIG. 11.

In step S540, the controller 500 may generate the first to third combination seeds on the basis of the randomizing seed RDS, the derandomizing seed DRDS and the first to third error information stored in step S440. In step S550 the controller 500 transmits the first to third combination seeds to the semiconductor memory device 100.

In step S560, the semiconductor memory device 100 may read first to third page data from the buffer memory block 110A. In step S570, the semiconductor memory device 100 may perform logical operations on the first to third page data and the first to third combination seeds. In step S580, the semiconductor memory device 100 may perform the third program operation on the memory cells of the selected word line according to the first to third corrected page data. The memory cells of the selected word line according to the third program operation may have final target voltage distributions P3_0 to P3_7 as shown in FIG. 10c.

FIG. 13 is a conceptual view illustrating in detail the second or the third program operation.

Referring to FIG. 13, the semiconductor memory device 100 may read first to third page data PGD1 to PGD3 stored in the buffer memory block 110A (A), perform a logical operation on the read first to third page data PGD1 to PGD3 and the first to third combination seeds CS2_1 to CS2_3 to generate the first to third corrected page data CPGD2_1 to CPGD2_3, and perform a program operation on the memory cells of the selected word line of the main memory block 110B according to the first to third corrected page data CPGD2_1 to CPGD2_3.

Figure 14:
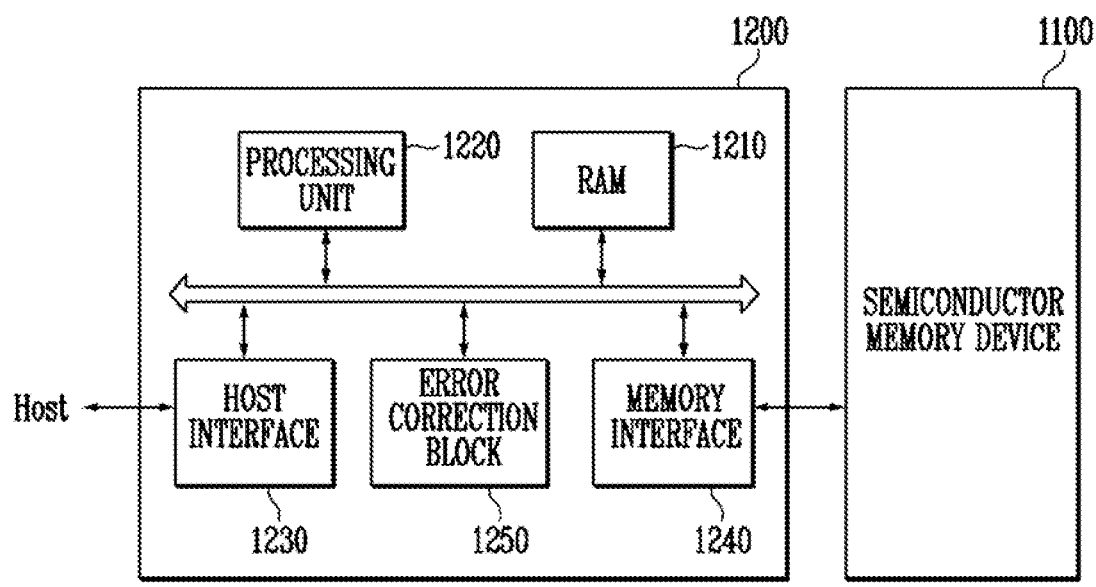
FIG. 14 is a block diagram showing an application example of the memory system of FIG. 1.

FIG. 14 is a block diagram showing an application example 1000 of the memory system 10 of FIG. 1.

Referring to FIG. 14, the memory system 1000 may include a semiconductor memory device 1100 and a controller 1200.

The semiconductor memory device 1100 may be the same as the semiconductor memory device 100 described with reference to FIG. 5. Hereinafter, repetitive descriptions will be omitted.

The controller 1200 may be connected with a host, and the semiconductor memory device 1100. The controller 1200 may include a random access memory (RAM) 1210, a processing unit 1220, a host interface 1230, a memory interface 1240, and an error correction block 1250.

The working memory of the processing unit 1220 may include a RAM 1210, a cache memory between the semiconductor memory device 1100 and the host, and a buffer memory between the semiconductor memory device 1100 and the host. The processing unit 1220 controls overall operations of the controller 1200.

As an example, the processing unit 1220 may drive firmware to perform functions of the randomizer 220 or 520, the derandomizer 230 or 530, and the logical operation block 240 or 540, which are described with reference to FIG. 1 or FIG. 8. As an example, source codes for performing functions of the randomizer 220 or 520, the derandomizer 230 or 530, and the logical operation block 240 or 540 may be stored in the semiconductor memory device 1100, each source code being loaded to the RAM 1210 when the memory system 1000 is driven, and the processing unit 1220 uses the source code loaded to the RAM 1210 to perform functions of the randomizer 220 or 520, the derandomizer 230 or 530, and the logical operation block 240 or 540, which are described with reference to FIG. 1 or FIG. 8. The controller 1200 may perform functions of the randomizer 220 or 520, the derandomizer 230 or 530, and the logical operation block 240 or 540, which are described with reference to FIG. 1 or FIG. 8, using various other methods. For example, the controller 1200 may additionally include hardware components corresponding to the randomizer 220 or 520, the derandomizer 230 or 530, and the logical operation block 240 or 540.

The host interface 1230 may include a protocol for exchanging data between the host and the controller 1200. As an example, the controller 1200 may communicate with the host via at least one of various interface protocols such as a universal serial bus (USB) protocol, a multimedia card (MMC) protocol, a peripheral component interconnection (PCI) protocol, PCI-Express (PCI-E) protocol, an advanced technology attachment (ATA) protocol, a Serial-ATA protocol, a Parallel-ATA protocol, a small computer small interface (SCSI) protocol, an enhanced small disk interface (ESDI) protocol, an integrated drive electronics (IDE) protocol, and a private protocol.

The memory interface 1240 may interface with the semiconductor memory device 1100. For example, the memory interface may include a NAND interface or NOR interface.

The error correction block 1250 may detect and correct an error in data read from the semiconductor memory device 1100 using an error correcting code (ECC). The error correction block 1250 may perform a function of the error correction block 550 described with reference to FIG. 8.

The controller 1200 and the semiconductor memory device 1100 may be integrated as one semiconductor device. As an example, the controller 1200 and the semiconductor memory device 1100 may be integrated as one semiconductor device to constitute a memory card. For example, the controller 1200 and the semiconductor memory device 1100 may be integrated as one semiconductor device to constitute a memory card such as a PC card (personal computer memory card international association (PCMCIA)), a compact flash card (CF), a smart media card (SM, SMC), a memory stick, a multimedia card (MMC, RS-MMC, MMCmicro) an SD card (SD, miniSD, microSD SDHC), a universal flash storage device (UFS), and the like.

The controller 1200 and the semiconductor memory device 1100 may be integrated as one semiconductor device to constitute a semiconductor drive (solid-state drive (SSD)). The semiconductor drive (SSD) may include a storage device suitable for storing data in the semiconductor memory. When the memory system 1000 is used as the semiconductor drive (SSD), the operation speed of the host, connected to the memory system 1000, may be dramatically improved.

As another example, the memory system 1000 may be provided as one of various components of an electronic apparatus such as a computer, a ultra-mobile PC (UMPC), a workstation, a net-book, a personal digital assistant (PDA), a portable computer, a web tablet, a wireless phone, a mobile phone, a smartphone, an e-book, a portable multimedia player (PMP), a portable gaming console, a navigation device, a black box, a digital camera, a 3-dimensional television, a digital audio recorder, a digital audio player, a digital picture recorder, a digital picture player, a digital video recorder, a digital video player, an apparatus capable of transmitting and receiving information in a wireless environment, one of various electronic apparatuses constituting a home network, one of various electronic apparatuses constituting a computer network, one of various electronic apparatuses constituting a telematics network, a radio frequency identification (RID) device, and one of various components forming a computing system.

As an example, the semiconductor memory device 1100 or memory system 1000 may be mounted in various types of packages. The semiconductor memory device 1100 or memory system 1000 may be mounted in a package such as a package on package (PoP), a ball grid array (BGA), a chip scale package (CSP), a plastic leaded chip carrier (PLCC), a plastic dual in line package (PIP), a die in waffle pack, a die in wafer form, a chip on board (COB), a ceramic dual in line package (CERDIP), a plastic metric quad flat pack (MQFP), a thin quad flat pack (TQFP), a small outline integrated circuit (SOIC), a shrink small outline package (SSCP), a thin small outline package (TSOP), a thin quad flat pack (TQFP), a system in package (SIP), a multi-chip package (MCP), a wafer-level fabricated package (WFP), a wafer-level processed stack package (FISP), or the like.

Figure 15:
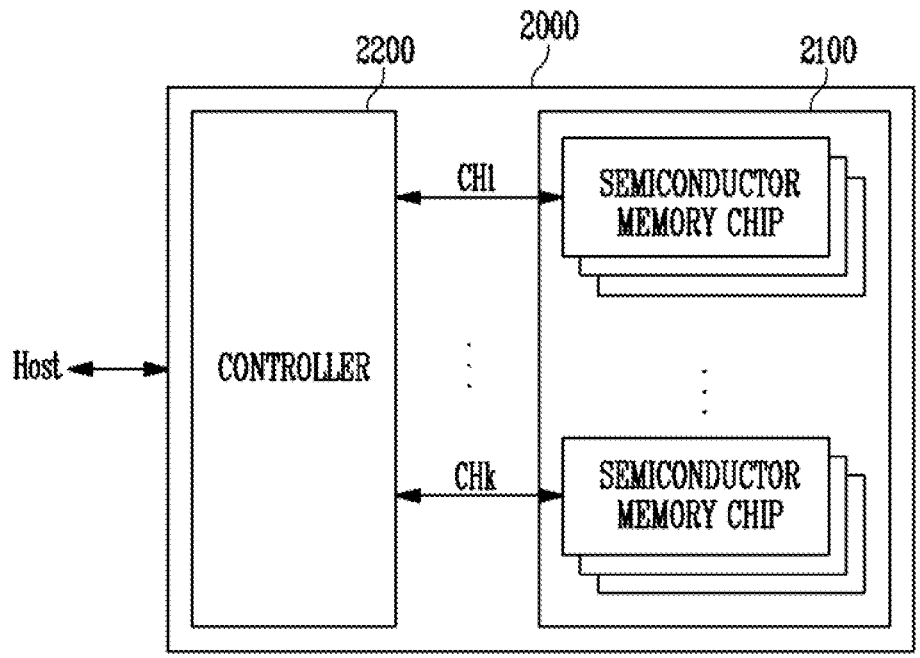
FIG. 15 is a block diagram showing an application example of the memory system of FIG. 9

FIG. 15 is a block diagram showing an application example 2000 of the memory system 1000 of FIG. 9.

Referring to FIG. 15, the memory system 2000 may include a semiconductor memory device 2100 and a controller 2200. The semiconductor memory device 2100 may include a plurality of semiconductor memory chips. The plurality of semiconductor memory chips may be classified into a plurality of groups.

In FIG. 15, the plurality of groups are shown communicating with the controller 2200 over first to kth channels CH1 to CHk, respectively. Each semiconductor memory chip may be configured the same as the semiconductor memory device 100 described with reference to FIG. 5.

Each group may communicate with the controller 2200 over one common channel. The controller 2200 may be the same as the controller 200 described with reference to FIG. 1 or the controller 500 described with reference to FIG. 8, and configured to control the plurality of memory chips of the semiconductor memory device 2100 via the plurality of channels CH1 to CHk.

In FIG. 15, the plurality of semiconductor memory chips are described to be connected to one channel. However, it is appreciated that the memory system 2000 may be modified such that one semiconductor memory chip may be individually connected to one channel.

Figure 16:
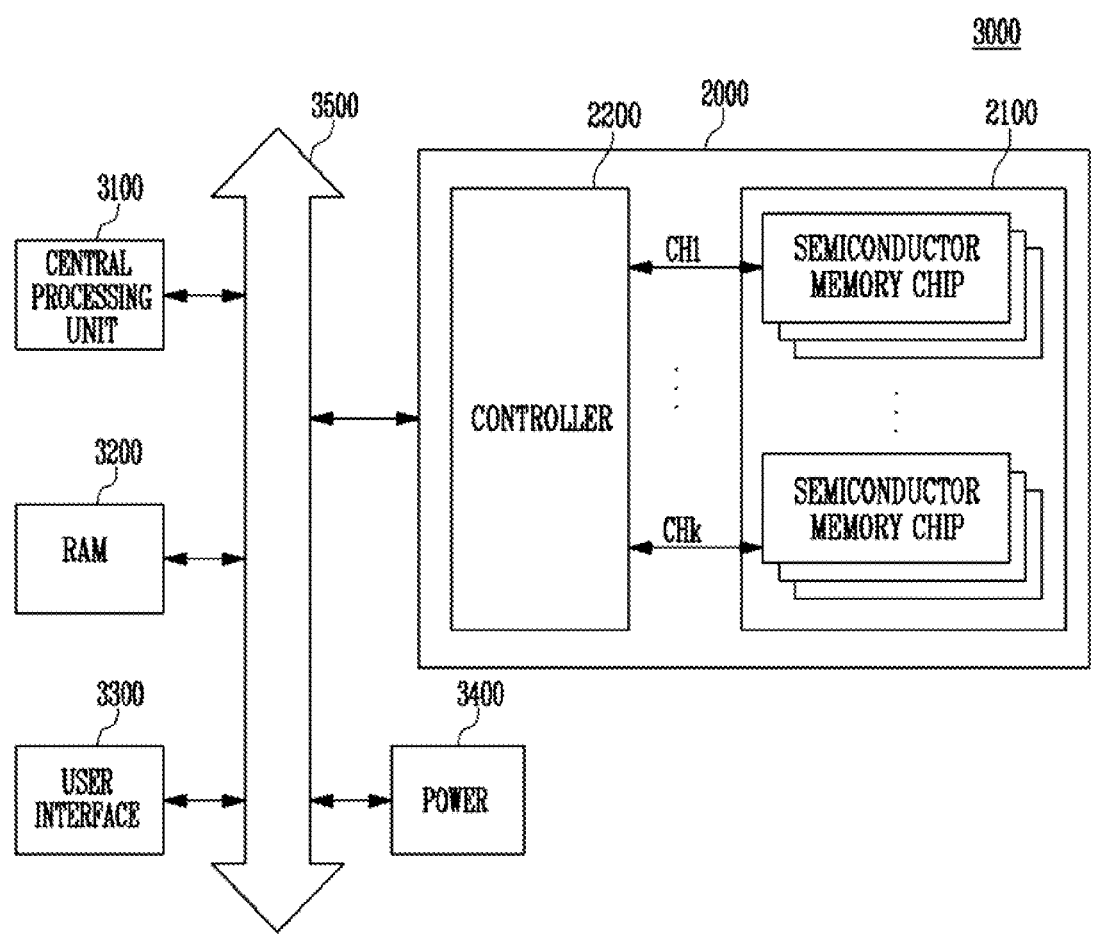
FIG. 16 is a block diagram showing a computing system including the memory system illustrated with reference to FIG. 15.

FIG. 16 is a block diagram showing a computing system 3000 including the memory system 2000 illustrated with reference to FIG. 15.

Referring to FIG. 16, the computing system 3000 may include a central processing unit 3100, a random access memory (RAM) 3200, a user interface 3300, a power supply 3400, a system bus 3500, and the memory system 2000.

In addition, the memory system 2000 may be electrically connected to the central processing unit 3100, the RAM 3200, the user interface 3300, and the power supply 3400 via the system bus 3500. Data provided through the user interface 3300 or processed by the central processing unit 3100 may be stored in the memory system 2000.

As in FIG. 16, the semiconductor memory device 2100 may be connected to the system bus 3500 through the controller 2200. However, the semiconductor memory device 2100 may be directly connected to the system bus 3500. In this case, the function of the controller 2200 may be performed by the central processing unit 3100 and the RAM 3200.

The memory system 2000 illustrated with reference to FIG. 15 is shown in FIG. 16. However, the memory system 2000 may be replaced with the memory system 10 described with reference to FIG. 1, the memory system 700 described with reference to FIG. 8, or the memory system 1000 described with reference to FIG. 14. As an example, the computing system 3000 may include all of the memory systems 10, 700, 1000, and 2000 described with reference to FIGS. 1, 8, 14, and 15.

According to an embodiment of the present invention, the time to transmit and receive the page data and the corrected page data between the semiconductor memory device 100 and the controller 500 may be reduced during the copy operation. Thus, the speed of the copy operation may be improved.

According to an embodiment of the present invention, it is possible to provide a memory system having an enhanced operating speed and an operating method thereof.

While the present invention has been described with reference to exemplary embodiments, it will be apparent to those skilled in the art that various changes and modifications may be made without departing from the spirit and scope of the present invention. Thus, the scope of the present invention shall not be restricted or limited by the foregoing detailed description, but is to be determined by the following claims and their equivalents.

What is claimed is:

1. A memory system comprising:
   a semiconductor memory device including a buffer memory block configured to store page data, and a main memory block; and
   a controller configured to generate a combination seed by performing a logical operation on a derandomizing seed of the page data, a randomizing seed of a selected region in the main memory block, and error information, and to provide the combination seed to the semiconductor memory device,
   wherein the semiconductor memory device generates corrected page data by performing a logical operation on the page data and the combination seed, and performs a first program operation on the selected region in the main memory block according to the corrected page data.

2. The memory system of claim 1, wherein the controller receives the page data from the semiconductor memory device and generates the error information by performing an error correction operation on the basis of the page data, thereby generating the combination seed.

3. The memory system of claim 2, wherein the controller performs a logical operation on the page data and the derandomizing seed to generate first raw data and performs the error correction operation on the first raw data to generate second raw data.

4. The memory system of claim 3, wherein the controller performs a logical operation on the second raw data and the randomizing seed to generate processed data and transmits the processed data to the semiconductor memory device.

5. The memory system of claim 4, wherein the semiconductor memory device performs a second program operation on the selected region of the main memory block according to the processed data.

6. A memory system comprising:
   a semiconductor memory device including a buffer memory block configured to store first to third page data and a main memory block; and
   a controller configured to generate first to third processed data by performing first to third error correction operations based on the first to third page data, to provide the first to third processed data to the semiconductor memory device, and to temporarily store first to third error information obtained from the first to third error correction operations, wherein the semiconductor memory device performs a first program operation on selected memory cells of the main memory block according to the first to third processed data, and the controller generates first to third combination seeds by performing a logical operation on the first to third error information and derandomizing and randomizing seeds, and provides the first to third combination seeds to the semiconductor memory device.

7. The memory system of claim 6, wherein the semiconductor memory device reads the first to third page data from the buffer memory block and performs a logical operation on the first to third page data and the first to third combination seeds to generate first to third corrected page data.

8. The memory system of claim 7, wherein each of memory cells of the main memory block is a triple level cell (TLC), and the first to third corrected page data are least significant bit (LSB) data, central significant bit (CSB) data, and most significant bit (MSB) data to be stored in the selected memory cells.

9. The memory system of claim 7, wherein the semiconductor memory device performs a second program operation on the selected memory cells of the main memory block according to the first to third corrected page data.

10. The memory system of claim 9, wherein, in order to perform a third program operation on the selected memory cells after the second program operation, the controller provides the first to third combination seeds to the semiconductor memory device.

11. The memory system of claim 10, wherein the semiconductor memory device reads the first to third page data from the buffer memory block during the third program operation and performs a logical operation on the first to third page data and the first to third combination seeds to generate the first to third corrected page data.

12. The memory system of claim 11, wherein the semiconductor memory device performs the third program operation on the selected memory cells of the main memory block according to the first to third corrected page data.

13. The memory system of claim 6, wherein the controller performs a logical operation on the first to third page data and the derandomizing seed to generate first to third raw data and performs the first to third error correction operations on the first to third raw data to generate fourth to sixth raw data.

14. The memory system of claim 13, wherein the controller performs a logical operation on the fourth to sixth raw data and the randomizing seed to generate the first to third processed data and transmits the first to third processed data to the semiconductor memory device.

15. A memory system comprising:
a semiconductor memory device including a first and second memory block, wherein the first memory block stores one or more page data; and
a controller configured to generate one or more combination seeds by performing logical operations on error information and derandomizing and randomizing seeds,
wherein the semiconductor memory device generates one or more corrected page data by performing logical operations on the one or more page data and the combination seed, and performs a first program operation on the second memory block according to the one or more corrected page data, and
wherein the controller generates error information by performing one or more error correction operations on the basis of the one or more page data.

16. The memory system of claim 15, wherein the controller generates the information by generating a first group of raw data through logical operations on the one or more page data and the derandomizing seed, and by performing the error correction operation on the first group of raw data.

17. The memory system of claim 16, wherein the controller further generates processed data by generating a second group of raw data through the error correction operation on the first group of raw data, and by performing logical operations on the second group of raw data and the randomizing seed.

18. The memory system of claim 17, wherein the semiconductor memory device performs a second program operation on the second memory block according to the processed data before performing the first program operation.

* * * * *